United States Patent [19]

Jido

[11] 4,383,767
[45] May 17, 1983

[54] METHOD FOR BLENDING BY COMBINING FINE PARTICLES

[75] Inventor: Morio Jido, Tokyo, Japan

[73] Assignees: Agency of Industrial Science & Technology; Ministry of International Trade & Industry, both of Tokyo, Japan

[21] Appl. No.: 203,901

[22] Filed: Nov. 4, 1980

[30] Foreign Application Priority Data

Nov. 5, 1979 [JP] Japan .................................. 54/142902

[51] Int. Cl.³ .............................. B01F 3/20; B01F 3/08
[52] U.S. Cl. .................................... 366/154; 366/178; 366/348; 366/349
[58] Field of Search ............... 366/348, 349, 136, 154, 366/178; 60/749; 123/536; 137/827; 361/228

[56] References Cited

U.S. PATENT DOCUMENTS

| | | | |
|---|---|---|---|
| 3,841,824 | 10/1974 | Bethel | 60/749 X |
| 4,034,966 | 7/1977 | Suh et al. | 366/176 |
| 4,117,550 | 9/1978 | Folland et al. | 366/136 |

Primary Examiner—Philip R. Coe
Assistant Examiner—Joseph M. Pitko
Attorney, Agent, or Firm—Kurt Kelman

[57] ABSTRACT

A method for blending at least two substances of different properties by combining fine particles thereof comprises exposing the at least two substances to corona discharges of opposite polarities, finely dividing the electrically charged substances and causing the finely divided particles of the substances to come into intimate contact with each other.

5 Claims, 7 Drawing Figures

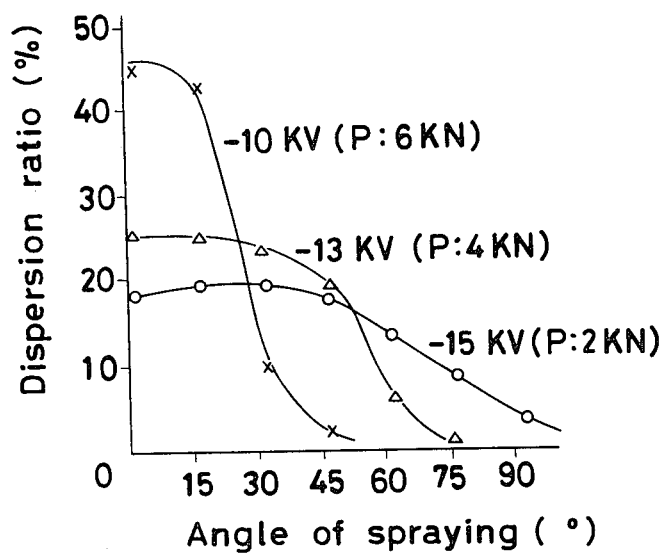
Fig_2
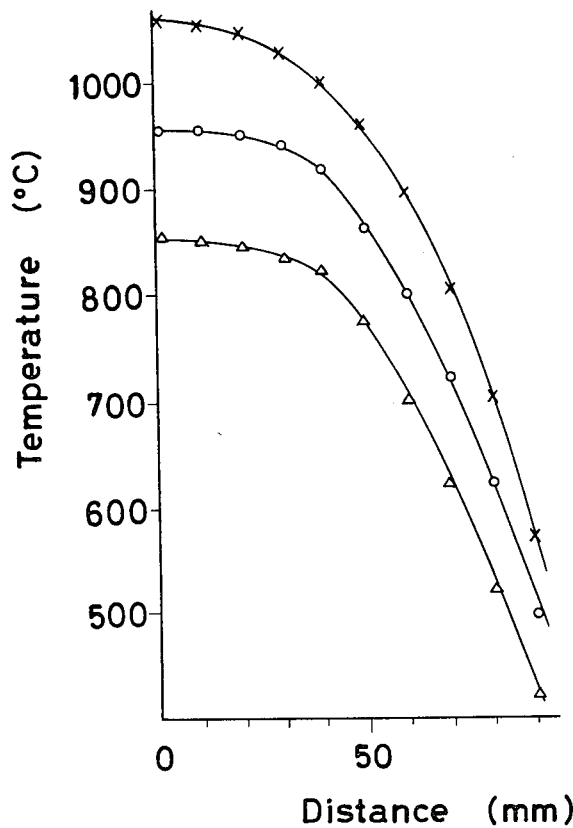
Fig_7
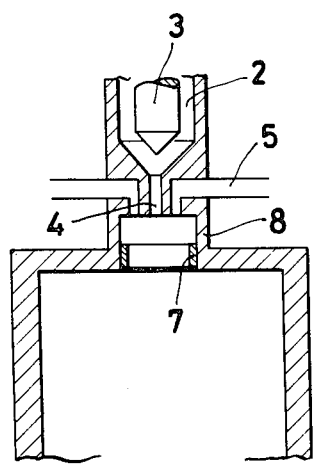
Fig_4

Fig_5
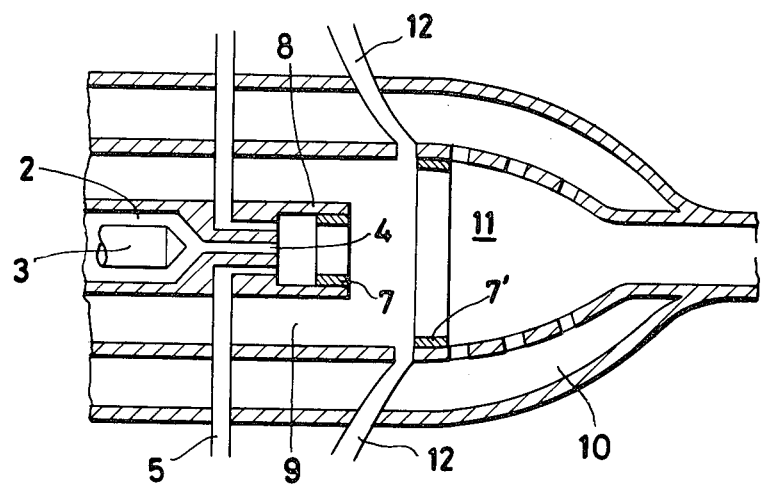
Fig_6

METHOD FOR BLENDING BY COMBINING FINE PARTICLES

BACKGROUND OF THE INVENTION

This invention relates to a method for blending two or more substances of different properties both in a dispersed state by utilizing the activity of corona discharge or electric field to combine fine particles of the substances.

Heretofore in the blending of at least one hydrophobic liquid with at least one oleophobic liquid, it has been customary to emulsify or solubilize the liquids by using a surfactant suitable for the properties of the liquids being mixed thereby lowering their surface tension and, then, effect fine division of the blended liquids by using a mechanical external force effective in reducing the liquids into minute droplets.

Some liquids to be blended are such that they do not tolerate exposure to any surfactant and some of the surfactants are poisonous to the liquids being blended. It is, therefore, desirable to avoid use of any surfactant so far as circumstances permit. Also when fine particles of such different liquids are blended using a mechanical force, the operating conditions such as, for example, those of temperature, velocity of air flow, pressure and rotating speed of the stirrer, must be exactly selected. This selection has proved quite complicated.

SUMMARY OF THE INVENTION

An object of this invention is to provide a method for causing two or more substances of different dielectric constants to be blended, by a very simple procedure not requiring the use of a surfactant indispensable to the conventional method, into a mixture of minute particles possessing particle diameters proper to the purpose for which the produced mixture is to be used.

To accomplish the object described above according to the present invention, there is provided a method for blending two or more substances such as liquids, possessing different dielectric constants by combining fine particles thereof, which comprises exposing the two substances to corona discharges necessary for electrically charging the substances to opposite polarities and bringing oppositely charged minute particles of the substances into electrostatic combination. By thus exposing the substances to be blended to corona discharges, the substances (particles), when in a liquid state, have their surface tension lowered and they are ionized because of the corona discharges of opposite polarities. Then, by mutual contact, the ionized substances are electrostatically combined.

Since the method of the present invention effects the blending of such two substances by using neither a surfactant nor a mechanical external force, it can provide the blending quite readily without affecting the properties inherent to the substances being blended.

The other objects and characteristics of the present invention will become apparent from the further disclosure of the invention to be made hereinbelow with reference to the accompanying drawing.

BRIEF EXPLANATION OF THE DRAWING

FIG. 2 is a graph showing the relation between the voltage applied and the angle of spraying as involved in the spraying of kerosene.

FIG. 4 is an explanatory diagram illustrating the method for combining minute particles of two substances according to the present invention, as applied to a diesel engine.

FIG. 5 is an explanatory diagram illustrating the method for combining minute particles of two substances according to the present invention, as applied to a jet combustion device.

FIG. 6 is a photomicrograph showing the condition in which water and kerosene have been blended by the method of the present invention.

FIG. 7 is a diagram of temperature distribution obtained by blending kerosene and water by the method of this invention and burning the resultant mixture.

DESCRIPTION OF THE PREFERRED EMBODIMENT

Generally, each liquid has its own inherent dielectric constant and it is ionized by corona discharge in an electric field. The intensity of this corona discharge which electrically charges minute particles of the liquid is peculiar to the liquid. Further, the liquid has its suface tension affected by the corona discharge. This fact means that the surface tension of the liquid can be adjusted with a certain degree of freedom by suitably selecting the intensity of the corona discharge effected upon the liquid, indicating that the corona discharge functions similarly in this respect to the surface active agent. Since the reduction in the surface tension results in the acceleration of the division of the liquids, the division can be readily obtained even in the case of highly viscous liquids by first ionizing them and then spurting out the ionized liquids. Further the intensity of corona discharge performed for the division of these liquids manifests itself in the extent to which the fine division of liquid is accelerated. Visually, the fineness of the electrically charged minute particles of liquids consequently obtained will reflect the intensity of corona discharge actually performed.

When these electrically charged minute particles are spurted out such as through a nozzle, the individual electrically charged minute particles are electrostatically in a mutually repulsive state so that they are dispersed in an angle which is proportional to the intensity of the corona discharge. The electrically charged minute particles of the two substances in their dispersed state, therefore, can be brought into mutual combination by making effective use of the electrostatic properties described above, namely by having the minute particles of the two substances electrically charged to opposite polarities and dispersing them through separate nozzles. In this case, since the corona discharge fulfills the same function of lowering the surface tension of liquids as the surfactant, the same emulsification or solubilization of the two substances can be accomplished as when the surfactant is used for that purpose.

On the basis of this principle, the present invention effects the combination of the minute particles of two or more substances. Specifically, the method of this invention comprises exposing two or more substances of different dielectric constants to corona discharges necessary for electrically charging them to opposite polarities, dividing them into minute particles, then dispersing the minute particles and allowing the minute particles in a dispersed state to be electrostatically brought into combination. The method of the present invention, therefore, can be applied of course to the combination of minute particles of such liquids as water and oil, for example and even to the combination of two or more powders of different dielectric constants or that of at least one liquid and at least one powder each having a different dielectric constant.

Figure 1:
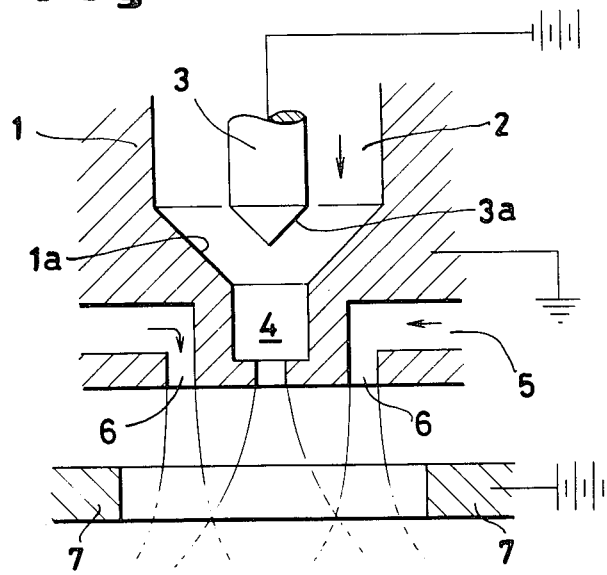
FIG. 1 is an explanatory diagram illustrating one embodiment of the apparatus suitable for working the method of the present invention.

FIG. 1 illustrates the construction of an apparatus utilized advantageously for working the present invention. A conical electrode 3 for corona discharge adapted to apply a high negative voltage is disposed inside a first liquid passage 2 formed within a grounded nozzle proper 1, with a conical discharge surface 3a at the leading end of the electrode 3 opposed to a conical discharge surface 1a of the nozzle proper 1 bordering on the liquid passage 2. A spurting aperture 6 for a second liquid passage 5 is formed around a spurting aperture 4 wherein the aforementioned liquid passage 2 opens into the nozzle proper 1. An annular electrode 7 adapted to apply a high positive voltage is disposed to surround the aforementioned spurting aperture 6 in front of the nozzle proper 1. The spurting aperture 6 may be formed of one single annular nozzle or a plurality of spurting nozzles spaced circumferentially.

In an apparatus of the construction described above, when a liquid such as oil which has a small dielectric constant is supplied to the passage 2 with its flow volume and pressure regulated at their respective predetermined values, the liquid is passed through the space intervening between the discharge surface 1a of the nozzle proper 1 and the discharge surface 3a of the electrode 3 and spurted through the spurting aperture 4. Since a high voltage is applied meanwhile to the aforementioned electrode 3, an electric field is formed between the discharge surfaces 1a, 3a and, at the same time, a corona discharge occurs with the liquid flowing through the passage 2 serving as the medium. While the liquid passes through this electric field, the electric field acts on the fluid to fluidify it and lower its surface tension. At the same time, the liquid is ionized. Consequently, the liquid is spurted out of the spurting aperture 4 in the form of electrically charged minute particles. In this case, the electrically charged minute particles pass through an electric field which is formed by the electrode 7 disposed in front of the nozzle proper 1. Since the liquid of which the minute particles are formed has a small dielectric constant, the effect of this electric field upon the electrically charged minute particles can be substantially eliminated by suitably setting the intensity of this electric field.

On the other hand, to the second liquid passage 5, another substance such as water which has a higher dielectric constant than the aforementioned liquid is supplied with its flow volume and pressure adjusted properly for the substance to be advantageously spurted out of the spurting aperture 6. While the second substance is passing through the electrode 7, it is readily fluidified within the electric field formed by the electrode because of its large dielectric constant. The substance, consequently, is dispersed in the form of a dispersion of electrically charged minute particles.

A high negative voltage is applied to the aforementioned electrode 3 and a high positive voltage to the electrode 7. Since high voltages of opposite polarities are applied as described above, the electrically charged minute particles of the two substances spurted through the spurting apertures 4, 6 are charged to opposite polarities. As a result, the two kinds of electrically charged minute particles produce electrostatically attracting force to each other and the minute particles both in a dispersed state are allowed to combine efficiently.

According to the method of this invention, therefore, fine particles of two or more liquids can be quite readily combined without necessitating use of any surfactant.

Examples of the substances which can be combined advantageously by the method of the present invention include water (dielectric constants within the range of from 70 to 90), ether and heavy oil and other petroleum products (dielectric constants 1 to 6), alcohols such as ethyl alcohol and glycerine (dielectric constants 20 to 60), and finely divided coal dust and other powders.

The voltages to be applied may suitably be selected in due consideration of the kinds of substances to be blended, the shape of electrodes to be used, the feed rates of the substances, etc. For practical purposes, the voltages are within the range of from 3 KV to 30 KV. Generally, a high voltage is applied to a substance having a small dielectric constant and a low voltage to a substance having a large dielectric constant.

For example, in an electrostatic atomization system of the construction of FIG. 1, the diameter of the spurting aperture 4 was fixed at 0.5 mm and the distance between the discharge surfaces 1a and 3a at 1.5 mm, kerosene (having a dielectric constant of about 2.0) was supplied at a rate of 23.5 g/min., and the voltage applied to the electrode 3 was changed to $-10$ KV, $-13$ KV and $-15$ KV. The distribution of angles of spraying of the kerosene at a distance of 15 cm from the nozzle was determined. The results were as shown in FIG. 2. In the graph of FIG. 2, the vertical axis represents the amount of kerosene dispersed and the horizontal axis the angle of sprying on one side of the axial line of the electrode.

It is seen from this graph that when the applied voltage was $-10$ KV, most of the kerosene was spurted from the nozzle within an angle of about 40°, but that when the applied voltage was changed to $-15$ KV, the kerosene was sprayed substantially throughout the entire front surface of the nozzle. Thus, the spraying angle of kerosene can readily be adjusted by controlling the voltage applied to the electrode 3. As concerns the fluidity of the liquid, the liquid pressure which was 6 KN at the voltage of $-10$ KV was changed to 2 KN when the applied voltage was varied to $-15$ KV, indicating that the fluidity of the liquid increases with the increasing magnitude of the applied voltage.

Figure 3:
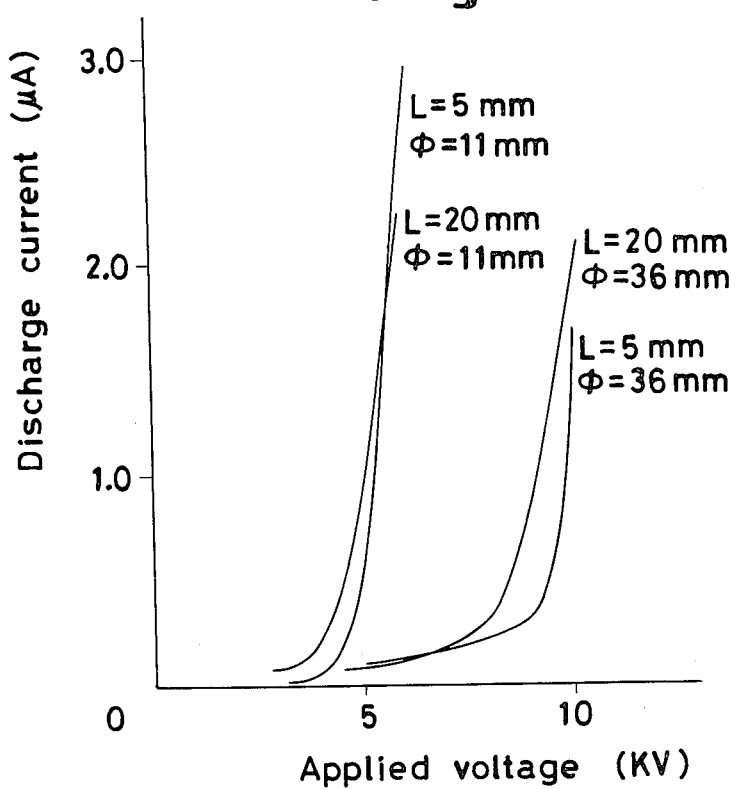
FIG. 3 is a graph showing the relation between the voltage applied and the volume of discharge current as involved in the spraying of water.

The graph of FIG. 3 shows the relation between the voltage applied to the annular electrode and the discharge current as determined by disposing an annular electrode 10 mm in thickness in front of the aforementioned nozzle, changing the inside diameter of the annular electrode to 11 mm and 36 mm, also changing the distance between the front surface of the nozzle and the annular electrode to 5 mm and 20 mm and supplying purified water (having an electric conductivity of $1 \times 10^6$ $\Omega$cm) at a flow volume of 30 cc/min. to the nozzle. In the graph mentioned above, the dispersing effect of the water is maximized near the point at which the curve shows a conspicuous change. It is seen from the graph that when the inside diameter of the annular electrode increases and the electrode approaches the nozzle 4, the voltage applied is slightly increased and the angle of spraying is notably increased. When the same test was performed by using alcohol in place of the purified water, the results were of the same trend as those obtained of the purified water.

The tests described above were invariably performed for the purpose of determining the relation between the voltage applied and the angle of spraying (amount of dispersion) with respect to liquids used independently. When a negative voltage is applied to the nozzle electrode and a positive voltage to the annular electrode and two or more liquids are spurted out with the apparatus of the construction of FIG. 1, the dispersed minute particles of the liquids are electrostatically combined.

An application of the method of this invention for the combination of minute particles to an improvised diesel engine is illustrated in FIG. 4. In FIG. 4, an apparatus constructed as shown in FIG. 1 is disposed in the engine side opening of a fuel supply pipe 8 and voltages of opposite polarities are applied to the electrodes 3, 7. Consequently, the water supplied through the passage 5 is efficiently combined with the fuel supplied through the passage 2. This efficient combination serves to enhance the combustion efficiency of the fuel and economize the fuel and, moreover, lower the $NO_x$, soot and/or ash contents in the exhaust gas.

FIG. 5 is an explanatory diagram illustrating the application of the method of this invention to a jet combustion device. Near the spurting aperture for jet fuel, electrodes 3, 7 adapted for application of positive and negative voltages are disposed. The jet fuel is supplied through the passage 2 and water is supplied through the pipe 5 and voltages of opposite polarities are applied to the electrodes. Consequently, the jet fuel and the water are ionized to mutually opposite polarities and combined with each other. The mixture of the minute particles of jet fuel and water is then mixed with primary air supplied through the passage 9 and secondary air supplied through the passage 10 and burnt. A finely divided coal may be supplied into the combustion chamber through pipes 12 so as to enhance the mechanical efficiency. In this case, a third annular electrode 7' is disposed in front of the open end of the fuel supply pipe 8 so that the finely divided coal from the pipes 12 passes by the third annular electrode 7', with the result that the coal is ionized and that the minute particles of jet fuel, water and coal are combined with one another and burnt.

The apparatus of FIG. 1 for carrying out the present invention is adapted to blend two substances by spraying one of the two substances from around the other substance which has been ionized and sprayed and ionizing the one substance by use of an annular electrode. Optionally, the blending of the two substances may be effected by using two sprayers, applying high potentials of opposite polarities respectively to the two substances sprayed from the sprayers so as to ionize the two substances and bringing the ionized substances into intimate contact with each other. Since the blended substances obtained by the method of the present invention keep their blended state for some period of time, immediate use thereof is not required.

As described above, the present invention enables two or more substances to be converted into minute particles of desired particle diameters and directly combined with one another by a very simple procedure.

Now, a working example of this invention will be described.

EXAMPLE

In a combustion chamber of the construction as illustrated in FIG. 4, the distance between the discharge surfaces **1*a* and 3*a* was fixed at 1.5 mm, the inside diameter of the nozzle 4 at 0.5 mm, the diameter of each of the two spurting apertures 6 at 0.15 mm, the inside diameter of the annular electrode 7 at 11 mm and the distance between the nozzle proper and the annular electrode at 9 mm respectively. Kerosene was supplied at a rate of 135 cc/min. through the passage 2 and water was supplied at a rate of 30 cc/min. through the spurting aperture 6 and a voltage of −18 KV was applied to the electrode 3 and a voltage of +10 KV to the annular electrode 7**.

A slide glass coated with a film of wax was held in the path of minute particles spurted through the annular electrode to collect a sample of particles on the film of wax. The slide glass was mounted in a microscope adjusted to about 400 magnifications, and then photographed through the microscope. The photomicrograph thus obtained is shown in FIG. 6.

It is seen in the photograph that minute particles of water are wrapped in and combined with minute particles of kerosene.

The product of the combination of kerosene and water was burnt. The distribution of temperature of the resultant combustion gas at a position 15 cm distant downwardly from the frame holder of the burner is shown in FIG. 7.

In the graph of FIG. 7, the vertical axis is graduated for the temperature of the combustion gas and the horizontal axis for the distance from the center of the flame to the circumference. The temperature at the center of the flame exceeded 1000° C. (as indicated by the curve marked with x's). The temperature of the combustion gas at the center of the flame was about 950° C. when kerosene alone was burnt (as indicated by the curve marked with blank circles "o"). When the combustion was made under the same conditions as indicated above except that the application of voltages to the annular electrode 7 was omitted, the temperature at the center of the flame was about 850° C. (as indicated by the curve marked with triangles "Δ").

What is claimed is:

1. A method for blending two substances having different dielectric constants, which comprises the steps of passing one of the substances having a lower dielectric constant through an electric field formed by a first electrode with facing discharge surfaces, the first electrode being shaped for generating a corona discharge, applying a high voltage of a first polarity to the first electrode for forming the electric field and generating the corona discharge whereby the one substance is ionized, finely divided and dispersed, applying a high voltage of a second polarity opposite to the first polarity to a second annular electrode having an annular opening, passing the finely divided and dispersed substance through the center of the annular opening of the second electrode, passing the other one of the substances having a higher dielectric constant through the annular opening of the second electrode so as to surround the one finely divided and dispersed substance whereby the other substance is ionized, finely divided and dispersed, the two ionized, finely divided and dispersed substances having charges of opposite polarities, and causing the oppositely charged, finely divided and dispersed substances to come into contact with each other immediately.

2. The blending method of claim 1, wherein the voltages are in the range of 3 to 30 KV.

3. The blending method of claim 1 or 2, wherein the substances are liquids.

4. The blending method of claim 3, wherein the one substance is kerosene.

5. The blending method of claim 3, wherein the other substances is water.

* * * * *